(12) United States Patent
Gropp et al.

(10) Patent No.: US 11,807,144 B2
(45) Date of Patent: Nov. 7, 2023

(54) ADJUSTABLE NECK SUPPORT

(71) Applicant: Brose Fahrzeugteile SE & Co. Kommanditgesellschaft, Coburg, Coburg (DE)

(72) Inventors: Jörg Gropp, Böhlen (DE); Jonas Scheler, Bad Rodach (DE)

(73) Assignee: Brose Fahrzeugtelle SE & Co. Kommanditgesellschaft, Coburg, Coburg (DE)

( * ) Notice: Subject to any disclaimer, the term of this patent is extended or adjusted under 35 U.S.C. 154(b) by 0 days.

(21) Appl. No.: 17/640,189

(22) PCT Filed: Aug. 31, 2020

(86) PCT No.: PCT/EP2020/074177
§ 371 (c)(1),
(2) Date: Mar. 3, 2022

(87) PCT Pub. No.: WO2021/043699
PCT Pub. Date: Mar. 11, 2021

(65) Prior Publication Data
US 2022/0340061 A1 Oct. 27, 2022

(30) Foreign Application Priority Data
Sep. 4, 2019 (DE) ..................... 10 2019 123 680.0

(51) Int. Cl.
*B60N 2/80* (2018.01)
*B60N 2/806* (2018.01)
*B60N 2/02* (2006.01)

(52) U.S. Cl.
CPC .......... *B60N 2/806* (2018.02); *B60N 2/0232* (2013.01); *B60N 2002/0236* (2013.01)

(58) Field of Classification Search
CPC ........ B60N 2/806; B60N 2/80; B60N 2/0232; B60N 2002/0236
USPC ....................................... 297/391
See application file for complete search history.

(56) References Cited

U.S. PATENT DOCUMENTS

| 5,836,651 A | 11/1998 | Szerdahelyi et al. |
| 7,755,233 B2 * | 7/2010 | Reimann ................ B60N 2/853 |
| | | 310/83 |
| 2004/0007910 A1 | 1/2004 | Skelly |
| 2009/0108654 A1 | 4/2009 | Petzel et al. |

FOREIGN PATENT DOCUMENTS

| DE | 19800077 A1 | 7/1999 |
| DE | 19925306 A1 | 12/2000 |
| DE | 19962637 A1 | 7/2001 |
| DE | 10146144 A1 | 4/2003 |
| DE | 102004042016 A1 | 3/2006 |
| DE | 102011080520 A1 | 2/2013 |
| DE | 102012015344 A1 | 3/2013 |
| DE | 102014201128 A1 | 7/2014 |

(Continued)

*Primary Examiner* — Mark R Wendell
(74) *Attorney, Agent, or Firm* — Dickinson Wright PLLC (57) ABSTRACT

A neck support for a backrest including a base for attachment to the backrest, a shield that is movable relative to the base and in use is at least sectionally movable in the direction of a user in order to support the neck of a user, and at least one pivoting element that connects the base to the shield via a slider that is shiftably mounted on the base.

14 Claims, 7 Drawing Sheets

(56) References Cited

FOREIGN PATENT DOCUMENTS

| | | |
|---|---|---|
| DE | 102014201173 A1 | 8/2014 |
| DE | 102015116463 A1 | 4/2016 |
| DE | 102015117980 A1 | 5/2016 |
| DE | 102016100873 A1 | 8/2016 |
| DE | 102016121973 A1 | 6/2017 |
| DE | 102016207620 A1 | 11/2017 |
| DE | 102017209880 A1 | 12/2018 |
| EP | 1241047 A2 | 9/2002 |
| EP | 2163171 A1 | 3/2010 |
| EP | 3100906 A1 | 12/2016 |
| KR | 19980025320 U | 8/1998 |
| KR | 101935205 B1 | 1/2019 |
| WO | 2008124859 A1 | 10/2008 |
| WO | 2015183730 A1 | 12/2015 |

* cited by examiner

ADJUSTABLE NECK SUPPORT

CROSS-REFERENCE TO RELATED APPLICATIONS

This application is the U.S. National Phase of PCT Application No. PCT/EP2020/074177 filed on Aug. 31, 2020, which claims priority to German Patent Application No. DE 10 2019 123 680.0, filed on Sep. 4, 2019, the disclosures of which are hereby incorporated in their entirety by reference herein.

TECHNICAL FIELD

This present disclosure relates to a neck support for a backrest for use in a vehicle seat.

BACKGROUND

Vehicles may include a number of vehicle seats provided with a backrest and a headrest. The height of the headrest may be adjustable with respect to the backrest. In some configurations, a neck support may be provided between the headrest and the backrest.

SUMMARY

One or more objects of the present disclosure may be to provide an improved neck support.

Accordingly, there is provided a neck support for a backrest, such as for a vehicle seat backrest. The neck support may include a base for holding the neck support at the backrest, a shield that is movable relative to the base (and in use sectionally or as a whole is movable in the direction of a user using the neck support), which provides e.g. a support surface for supporting the neck of a user, and a pivoting element, e.g. in the form of a pivoting clip, which connects the base to the shield via a slider shiftably mounted on the base, or a plurality of such pivoting elements and associated sliders.

In this way, there can be provided a neck support with a low-profile mechanism, which provides for a comfortable adjustability of the neck support even with limited space available on a vehicle seat. The shield is adjustable relative to the base e.g. in the direction of travel, when a vehicle seat comprising the neck support is mounted in the vehicle in the direction of travel. The shield is adjustable e.g. sectionally or as a whole perpendicularly to the support surface of the shield. In addition, the neck support can include a height adjuster in order to be adjustable in its height relative to the backrest.

The shield and the pivoting element are mounted or mountable on the backrest via the base. The base can be of one-part design or comprise several parts attached to each other. The shield may be a flexible flat element, e.g. a moldable plastic part, which can adapt to the shape of the neck.

The at least one pivoting element is e.g. pivotally held on the slider which is shiftably mounted on the base. Alternatively, for example, it is articulated thereto in a flexural elastic way so that at least a large part of the pivoting element can be pivoted relative to the slider. Alternatively or additionally, the pivoting element is pivotally connected to the shield. Both of this provides for an easy extension and retraction of the shield.

Optionally, the neck support may include at least one spindle. It can be provided that the at least one slider is shiftable relative to the base by a rotation of the spindle. The slider is coupled e.g. with the spindle, for example is in engagement therewith. This provides for a fluent and precise setting and for a compact drive mechanism.

The neck support may include at least one motor for shifting the slider (or the sliders) relative to the base, such as for rotating the at least one spindle relative to the base. Motorized adjustability enables relatively convenient operation. In addition, the neck support in this way can be fitted into the backrest even more easily, without requiring installation space for a manual actuating element.

Furthermore, the neck support can comprise several, such as two pivoting elements which are each pivotally mounted on one of two sliders. It can be provided that the shield is pivotally mounted on each of the pivoting elements. In this way, the shield substantially can be shifted back and forth (relative to the base) in parallel, which allows a particularly good support function, e.g. a comfortable sleeping position. Alternatively, the shield is attached to each of the pivoting elements in order to provide for setting a curvature of the shield.

The several, for example, two pivoting elements can be independently adjustable relative to the base. This provides for an asymmetric setting of the neck support. The shield can be centered e.g. by means of a pretensioning element. It can be provided that a force asymmetrically acting on the shield (e.g. during cornering) can laterally displace the shield so that e.g. a lateral acceleration of the seat user can be compensated.

In one variant, the neck support may include two spindles by the rotation of which one of the two sliders can each be shifted relative to the base, and which are operatively connected to each other, optionally integrally connected to each other via a shaft. Such an embodiment allows a simple construction which, in a motor-driven variant, may include only one motor.

Alternatively, the neck support can comprise two separate spindles (which with respect to their rotary movement relative to the base are not mechanically coupled with each other), by the rotation of which one of the two sliders per spindle each is shiftable relative to the base. The two spindles can each be rotatable relative to the base by one of two motors. This embodiment provides for an asymmetric setting of the position of the shield relative to the base.

In both of the aforementioned alternatives, the two spindles can be aligned coaxially to each other and/or perpendicularly to an adjustment axis along which the shield is adjustable relative to the base. This also provides for a relatively flat construction depth.

The shield can be elastic, e.g. be made of a spring plate. This provides for a relatively comfortable support function.

According to one aspect, there is provided a support unit for a backrest. The support unit may include a holder on which the backrest is mounted according to an arbitrary embodiment described herein, and optionally also may include a headrest.

According to another aspect, there is provided a backrest, such as for a vehicle seat. The backrest may include the neck support according to an arbitrary embodiment described herein or the support unit according to an arbitrary embodiment described herein.

According to another aspect, there is provided a backrest, such as for a vehicle seat. The backrest may include a backrest frame, a further backrest part mounted on the backrest frame so as to be movable relative to the backrest frame, a supporting unit movably mounted on the further backrest part (e.g. comprising a holder movable relative to the further backrest part), and a neck support, for example, according to another embodiment described herein. The neck support may include a base and a shield that is movable relative to the base in order to support the neck of a user, wherein the base is mounted on the support unit (e.g. on the holder of the support unit).

There can be provided a backrest comprising a neck support with a low-profile mechanism, which provides for a comfortable adjustability of the neck support even with limited space available on the backrest.

The further seat part may be a backrest head for supporting a shoulder region of a seat user.

Optionally, a headrest is mounted on the holder of the support unit, e.g. above the neck support with respect to a proper use of the vehicle seat.

According to another aspect, there is provided a vehicle seat comprising the backrest according to an arbitrary embodiment described herein.

According to one aspect, there is provided a neck support for a backrest (with a direction of longitudinal extension), comprising a base for attachment to the backrest, a shield that is movable relative to the base in order to support the neck of a user, and at least one pivoting element (or several, e.g. two of such pivoting elements), via which the base is connected to the shield, wherein it is provided that the pivoting element is mounted on the base in such a way that it can be asymmetrically deflected, e.g. against the force of a spring, in a lateral direction (in the state mounted on the backrest perpendicularly to the direction of longitudinal extension of the backrest).

BRIEF DESCRIPTION OF THE DRAWINGS

The idea underlying the invention will be explained in detail below with reference to the exemplary embodiments illustrated in the Figures. In schematic representations.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

DE 198 00 077 A1 describes a vehicle seat with a headrest and with a backrest to which the headrest, here consisting of holding rods and a head support part, is attached in a height-adjustable manner. Depending on the height setting, the headrest part is held at a distance from the backrest upper side by forming a passage, wherein a support member additionally is arranged in the vicinity of the passage, which serves as a neck support. By means of a telescope arrangement, the neck support is height-adjustably held in the vicinity of the aperture. The adjustability of this neck support is limited to the adjustment of the height (in a Z-direction), which also is limited by the size of the passage, which in turn depends on the setting of the headrest part.

From practice, the applicant furthermore knows about neck supports as accessory parts which can be inserted into a passage between the backrest upper side and a headrest as an appropriately shaped cushion. Thus, their use is limited to vehicle seats that include such a passage, and such accessory parts also can involve certain risks in the event of a crash.

Figure 1:
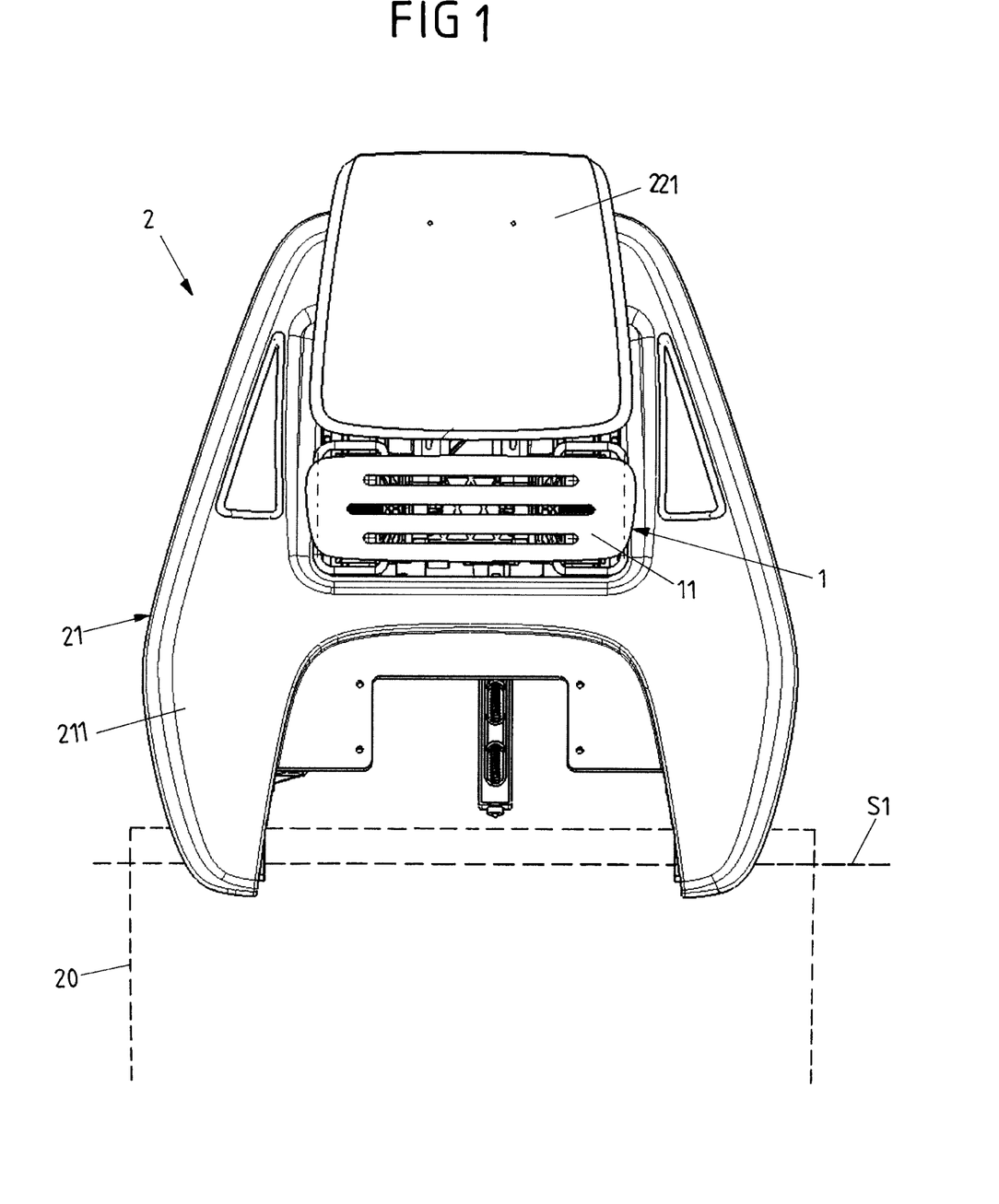
FIG. 1 shows a backrest with a backrest head on which a headrest and a neck support are mounted.

FIG. 1 shows a backrest 2 with a backrest frame 20 shown only schematically and a backrest head 21 that is pivotable relative to the backrest frame 20 about a pivot axis S1. The backrest head 21 may include a backrest head shield 211 that is configured to support a shoulder region of a seat user and therefor provides a supporting surface.

The backrest head shield 211 has a cutout in which a headrest 221 and, below the headrest 221, a neck support 1 are arranged. The neck support 1 may include a shield 11 that provides a supporting surface for the neck of the seat user. The seat user can lean against the supporting surface, optionally with the interposition of a cushion and/or a cover.

The neck support 1 is adjustable, in the concrete example along an adjustment axis that extends perpendicularly or approximately perpendicularly to the supporting surface of the shield 11.

Figure 2:
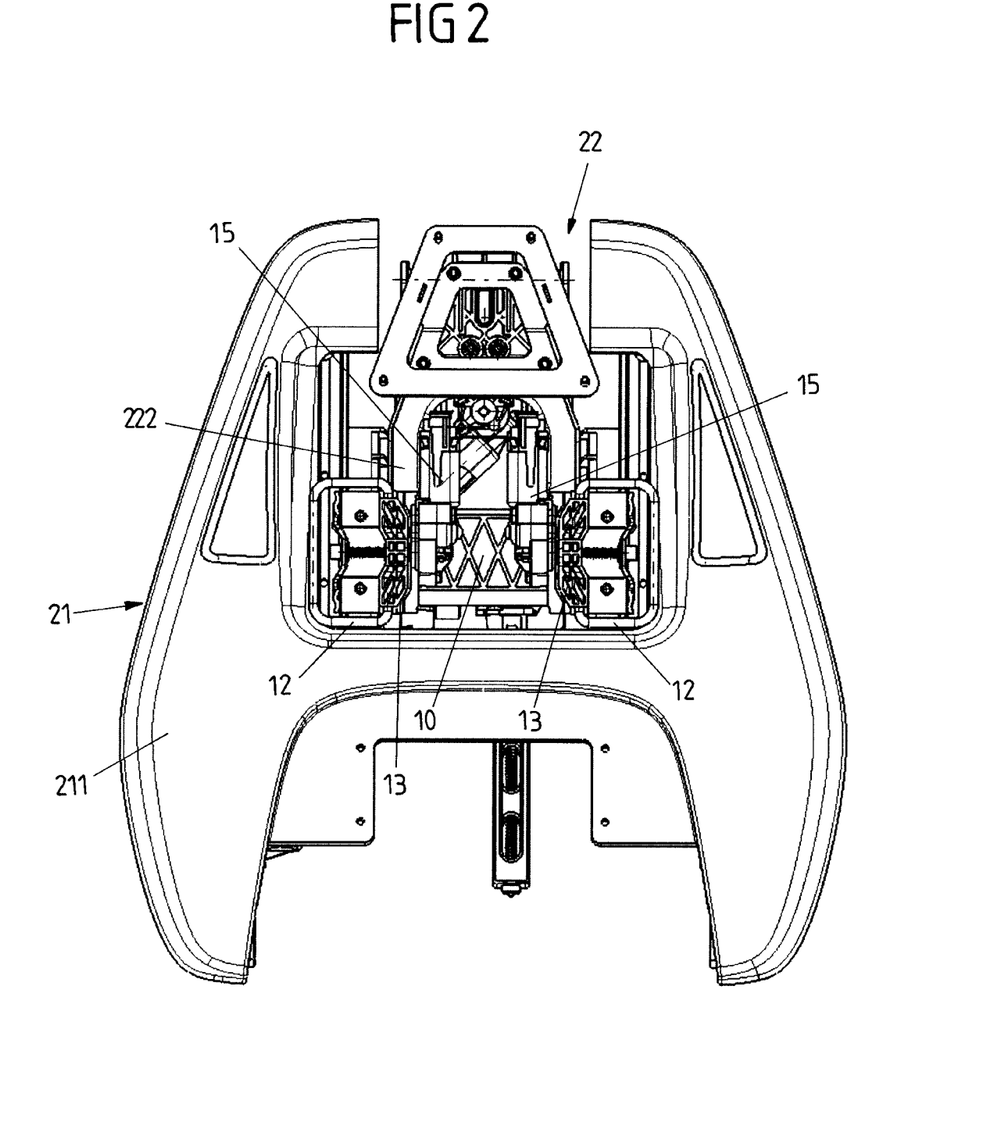
FIG. 2 shows the backrest head of FIG. 1, wherein the headrest and a shield of the neck support are not shown to reveal the parts underneath.

FIG. 2 shows the backrest head 21 shown in FIG. 1, wherein the headrest 221 and the shield 11 of the neck support 1 are not shown to reveal the parts underneath.

As can be seen, for example, with reference to FIG. 2, the neck support 1 may include a base 10 for the attachment of the neck support 1 to the backrest 2 and relative to which the shield 11 shown in FIG. 1 can be moved. Furthermore, the neck support 1 generally may include at least one pivoting element 12, here two pivoting elements 12, wherein the base 10 is connected to the shield 11 via one of the pivoting elements 12 and a slider 13 shiftably mounted on the base 10, respectively. For this purpose, each of the pivoting elements 12 is pivotally mounted on the associated slider 13. In the present case, the pivoting elements 12 each are configured in the form of a bracket (here U-shaped), wherein the two ends (bent towards each other) of the bracket are in engagement with the respective slider 13. In the example of FIG. 2, the ends of the brackets each are rotatably (or alternatively non-rotatably) inserted into a corresponding receptacle of the slider 13 on opposite sides of the slider 13. In an alternative embodiment, the pivoting element 12 and the slider 13 are formed integrally with each other and e.g. flexural elastically connected to each other.

The shield 11 is flexible and e.g. made of a spring steel, a plastic material, a fiber composite material, for example an organo-sheet. This allows it to adapt relatively comfortably to the shape and position of the neck of the seat user and transmit the support function of the pivoting elements 12. As an example, to improve ventilation and increase flexibility, the shield optionally includes slots which in the illustrated example extend between the attachment points of the pivoting elements 12 to the shield 11.

The shield 11 has approximately the same width as the headrest 221 arranged above the same. The shield 11 is oblong. The extension of the shield 11 (and its supporting surface) in the longitudinal direction (in the direction between the attachment points of the pivoting elements 12 to the shield 11, here corresponding to the width) is greater than its extension in the width direction (perpendicular thereto, here corresponding to the height).

With reference to the synopsis of FIGS. 1 and 2 it can be seen that both the neck support 1 and the headrest 221 form part of a support unit 22 that is mounted on the backrest head shield 211. The support unit 22 may include a holder 222 to which the headrest 221 is attached (concretely to a cantilever of the holder 222). In addition, the base 10 of the neck support 1 is attached to the holder 222. The holder 222 can also be regarded as part of the base 10.

Figure 3:
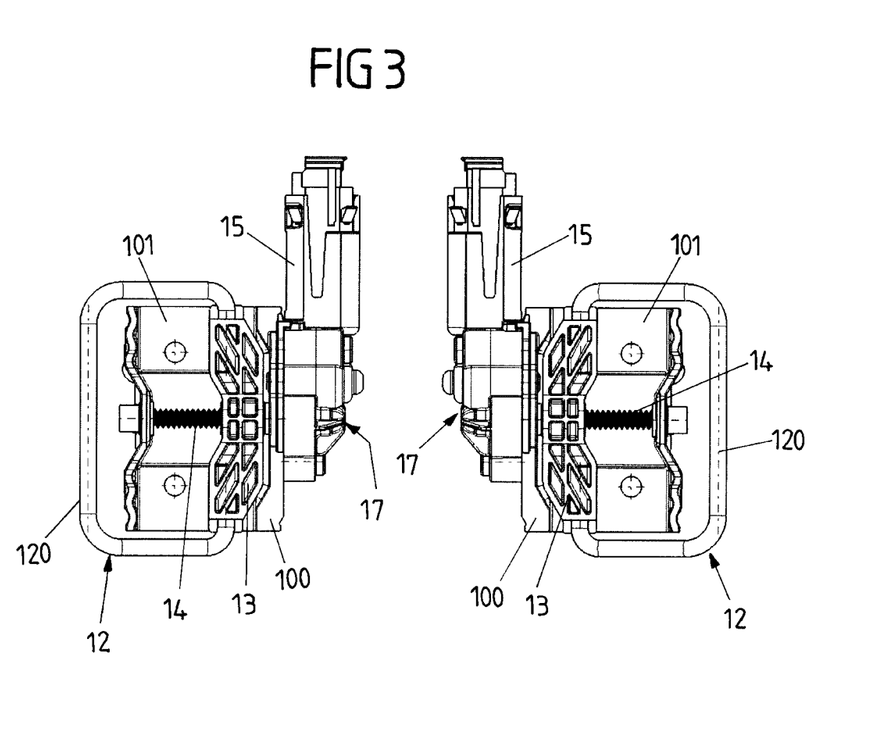
FIG. 3 shows an adjusting device of the neck support shown in FIGS. 1 and 2 with two motors.

FIG. 3 shows parts of the neck support 1 of FIGS. 1 and 2. The neck support 1 may include two motors 15, here electric motors, each of which is operatively connected to a spindle 14 (in the illustrated example via one transmission 17 each). Activation of the motors 15 causes rotation of the spindles 14. The spindles 14 each are mounted on a bearing 100. The corresponding motor 15 also is attached to the respective bearing 100. The bearings 100 form parts of the base 10 and are attached to the holder 222, here at a distance to each other. In an alternative embodiment, the bearings 100 are formed integrally with each other and/or with the holder 222.

Each of the spindles 14 is in engagement with one of the sliders 13. The sliders 13 are screwed onto the respective spindle 14. Each of the sliders 13 rests against an associated guide portion 101 of the base. The guide portion 101 prevents a rotation of the respective slider 13 relative to the base 10. A rotation of the spindles 14 effects a displacement of the respective slider 13 along the respectively associated guide portion 101. The sliders 13 move along the respective spindle 14.

The motors 15 are actuated and the helicities of the spindles 14 are aligned such that upon activation of the motors 15 the sliders 13 jointly slide to the outside, i.e. away from each other, or to the inside, i.e. towards each other.

FIGS. 1 to 3 show a fully retracted state of the neck support 1. The sliders 13 are arranged on a respective (inner) stop at an end of the corresponding guide portion 101 close to the respective other slider 13. The pivoting elements 12 rest against the base 10 flatly or at an obtuse angle open towards the shield 11. In the retracted state, the pivoting elements 12 extend in the same plane.

To extend the neck support 1, the motors 15 are activated so that the spindles 14 each are put into a rotational movement. The sliders 13 thereby are moved away from each other. The pivoting elements 12 each are coupled, in the present case rotatably coupled to the shield 11 via an end portion 120 facing away from the respective slider 13. As an alternative to rotatably coupling the pivoting elements 12 to the shield 11, a firm connection is also possible. As a result, the shield 11 then bulges corresponding to the setting of the sliders 13. Furthermore, it is possible to provide one or more oblong holes in or on the shield 11. The pivoting elements 12 can be guided along the same.

As the length of the shield 11 is constant, and therefore also the distance of the end portions 120 of the pivoting elements 12 to each other, the pivoting elements 12 are automatically put up when the sliders 13 are moved to the outside.

Optionally, the neck support 1 may include spring elements and/or a guide in order to effect centering of the shield 11 relative to the base 10. For adaptation to the neck of a user as freely as possible, such a spring/guide can also be omitted. Furthermore, an optional cover stretched over the neck support can urge or guide the shield 11 into a centered position.

Figure 4:
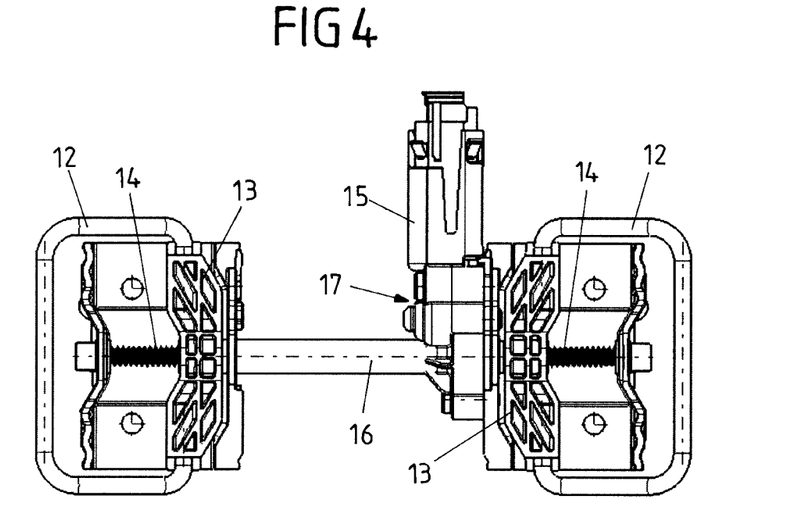
FIG. 4 shows an alternative adjusting device for the neck support shown in FIGS. 1 and 2 with one motor.

FIG. 4 shows a variant with (exactly) one motor 15. The spindles 14 have opposite helicities, the one spindle 14 is levorotatory, the other spindle 14 is dextrorotatory. The spindles 14 are non-rotatably, here integrally, connected to each other via a shaft 16. The two spindles 14 and the shaft 16 form a spindle unit. The motor 15 is operatively connected to the spindle unit via a transmission 17. By activating the motor 15, both spindles 14 are put into a joint rotation relative to the base 10. The two sliders 13 thereby are jointly moved to the outside, i.e. away from each other, or to the inside, i.e. towards each other, depending on the direction of rotation of the motor 15.

Figure 5A:
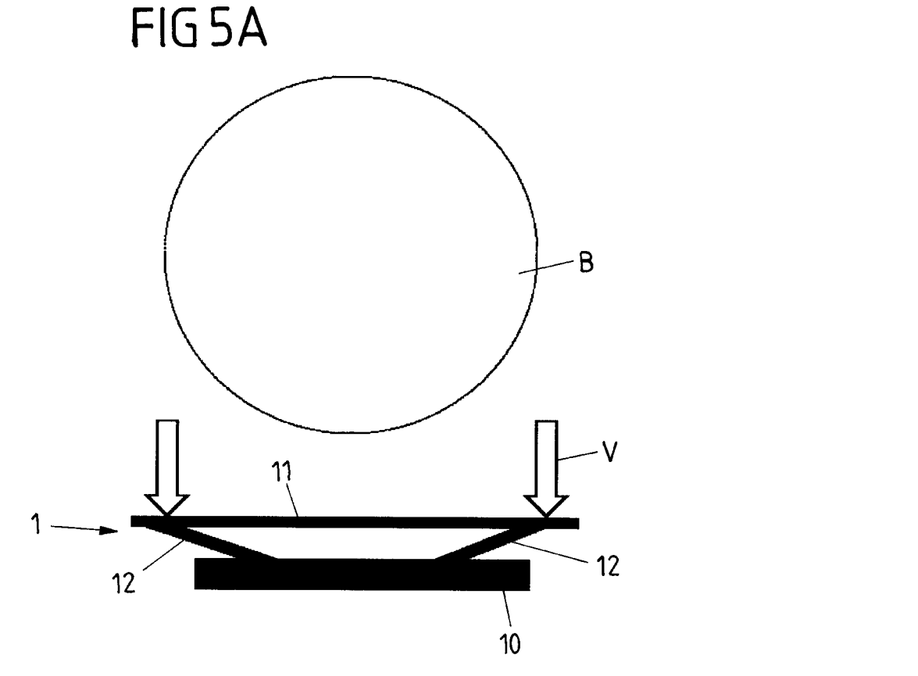
FIGS. 5A and 5B show schematic representations of two different adjustment positions of the neck support shown in FIGS. 1 and 2.
Figure 5B:
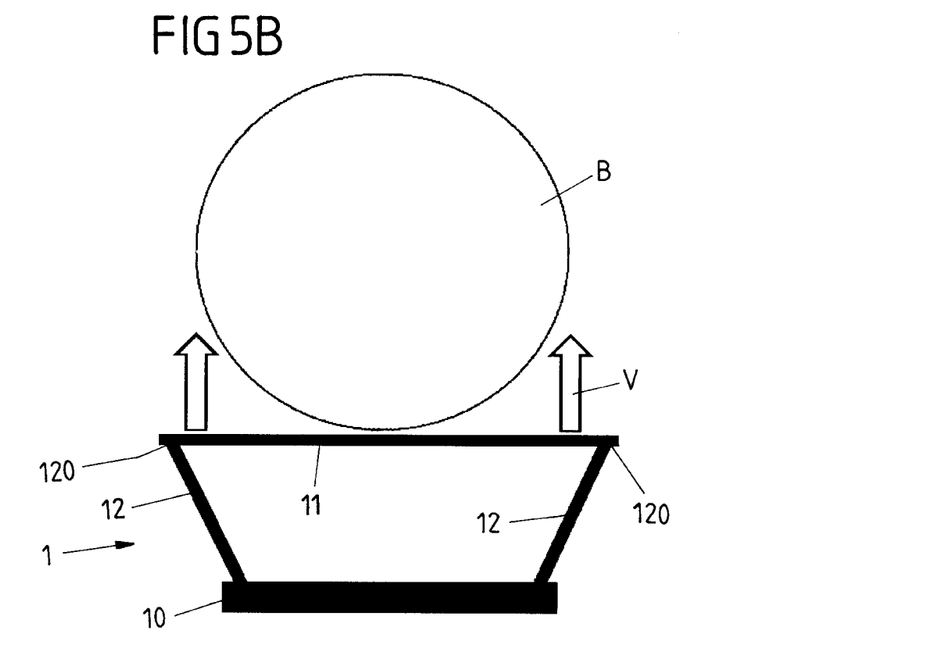

FIGS. 5A and 5B show schematic top views from above onto the neck support 1 and a schematically indicated neck area of a seat user B.

FIG. 5A shows a largely retracted state of the neck support 1, in which the shield 11 is arranged close to the base 10. The pivoting elements 12 include a large angle between themselves. The shield 11 is spaced apart from the neck of the seat user B.

FIG. 5B shows the extended state of the neck support 1, in which the shield 11 is arranged further away from the base 10, compared with the state shown in FIG. 5A. Arrows in FIGS. 5A and 5B represent the orientation of the adjustment axis V. The pivoting elements 12 describe a smaller angle relative to each other than in the position according to FIG. 5A. The neck of the seat user B is supported in the position according to FIG. 5B. It should be noted that depending on the anatomy of the seat user B and the position of the backrest 2 relative to a seat part and the position of the backrest head 21 relative to the backrest frame 20, a position other than the one according to FIG. 5B can be most suitable to support the neck of the seat user B.

As an example, a comparison of FIGS. 5A and 5B reveals that the ends of the pivoting elements 12 facing the base 10 are arranged closer to each other in the further retracted position than in the further extended position. In contrast, the distance between the ends (end portions 120) of the pivoting elements 12 facing the shield 11 does not change between these positions.

In the following, the adjustability of the support unit 22 and the headrest 221 will be explained in more detail with reference to FIGS. 6A to 6C. The support unit 22 is movable, in the present case shiftable relative to the backrest head shield 211 for height adjustment. The support unit 22 may include a carrier 220 that is movably, here shiftably mounted on the backrest head shield 211. The holder 222 (and hence the headrest 221 and the neck support 1) is movably mounted relative to the carrier 220 for horizontal adjustment, in the present case in a direction perpendicular or substantially perpendicular to the direction in which the support unit 22 is movable relative to the backrest head shield 211.

Figure 6A:
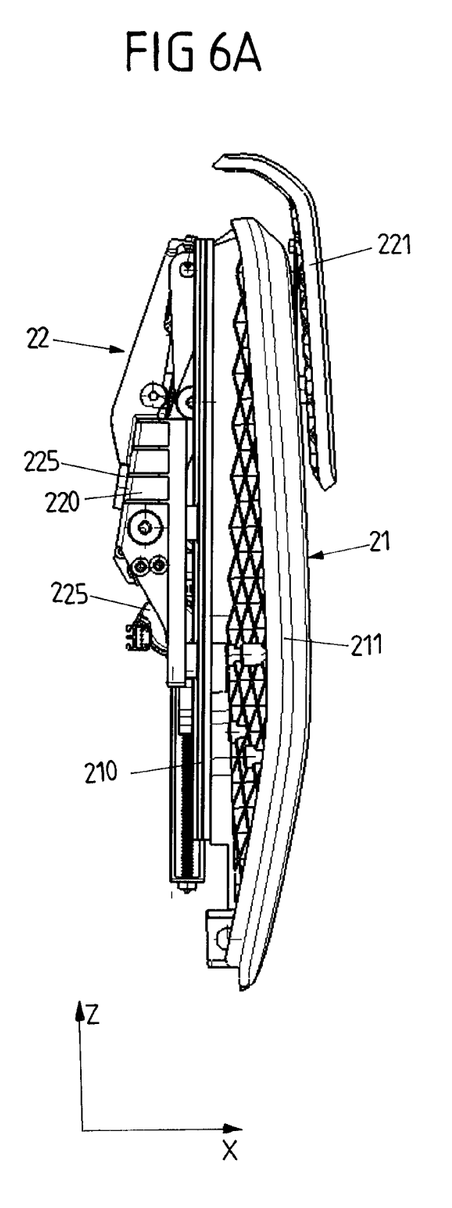
FIGS. 6A-6C show the backrest head with a supporting unit of FIG. 1 comprising a holder for the headrest and the neck support in various adjustment positions, wherein the neck support is not shown.
Figure 6B:
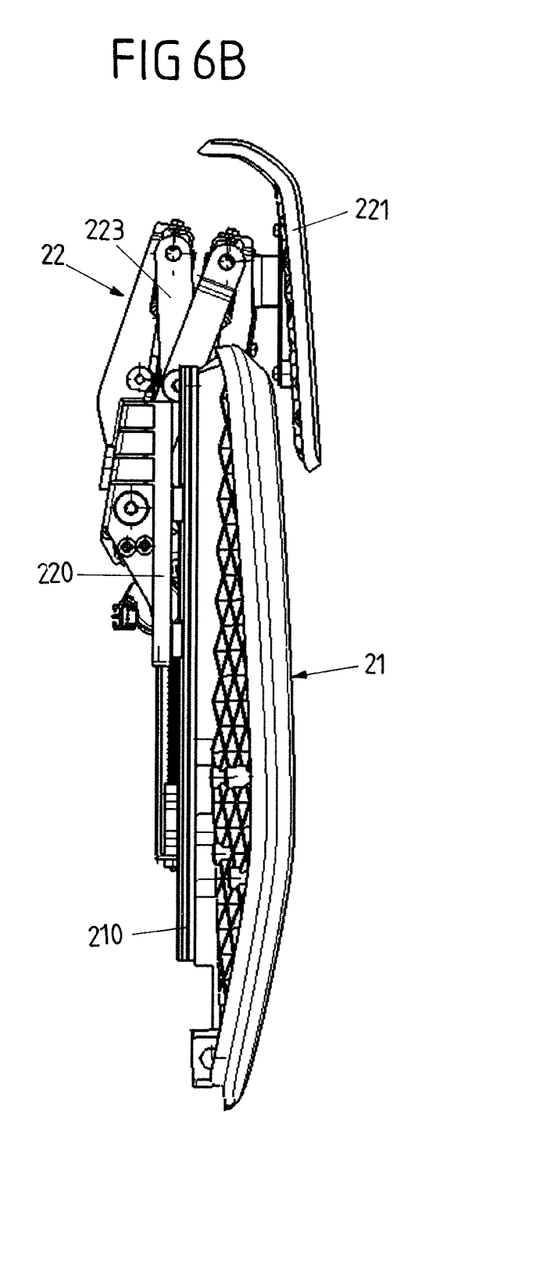

FIGS. 6A and 6B show two different height settings of the headrest 221. It can be seen, for example, how the carrier 220 is guided on rails 210 in order to change the position of the headrest 221 and the neck support 1 relative to the backrest head shield 211. The rails 210, one of which can be seen in the side view of FIGS. 6A and 6B and both of which can be seen in FIG. 2, are attached to the backrest head shield 211. While FIG. 6A shows the support unit 22 in the lowest position, FIG. 6B shows its highest position. At an upright position of the backrest 2, the direction of this adjustment extends parallel to the Z-axis of the vehicle system of coordinates, i.e. parallel to the height axis of the vehicle.

Figure 6C:
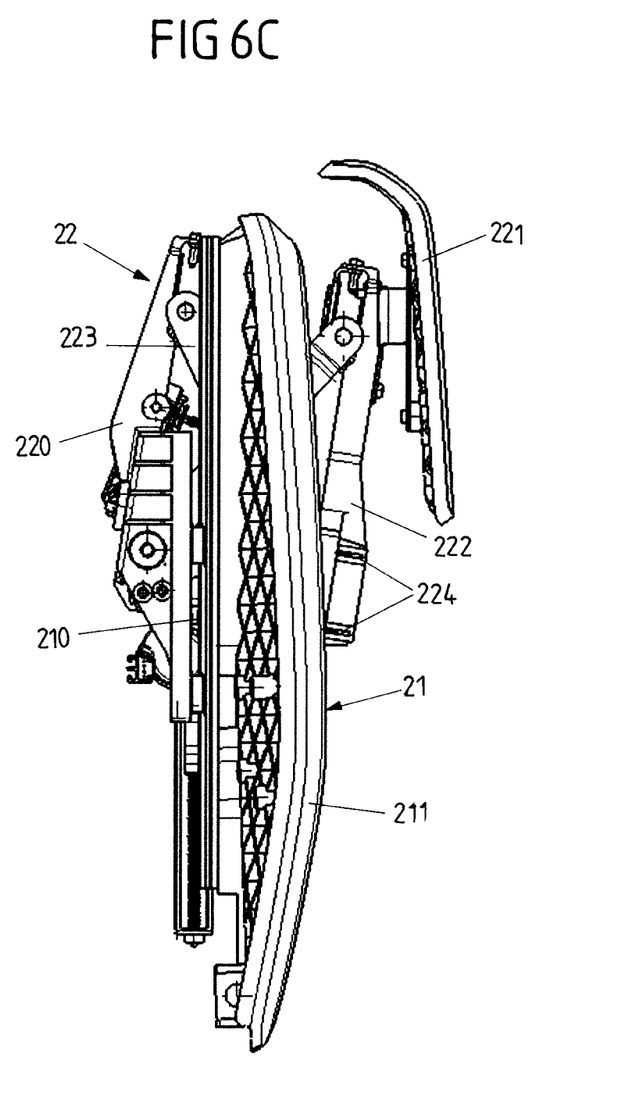

FIGS. 6A and 6B on the one hand, and FIG. 6C on the other hand, show two different horizontal settings of the headrest 221. The carrier 220 does not change its position relative to the backrest head shield 22 (cf. FIGS. 6A and 6C). However, the holder 222 of the support unit 22 can be extended and retracted again relative to the carrier 220 (and to the backrest head shield 211) by means of an adjusting mechanism, in the present case a scissor mechanism 223. The headrest 221 is attached to the holder 22 so that the headrest 221 is displaced relative to the carrier 220 and to the backrest head shield 211 when the adjusting mechanism is actuated. At an upright position of the backrest 2, the direction of this adjustment extends parallel to the X-axis of the vehicle system of coordinates, i.e. parallel to the longitudinal vehicle axis.

Below the headrest, the holder 222 has at least one fastening point 224 for attaching the neck support 1 to the holder 222, in the present case a plurality of fastening points 224 in the form of screw holes. In the mounted state, the neck support 1 is attached thereto, see e.g. FIG. 1.

For height adjustment and for horizontal adjustment of the support unit 22, the support unit 22 may include one motor 225 each, in the present case one electric motor each, wherein alternatively a manual adjustability also is conceivable in each case.

Thus, below the headrest 221 a device comprising an X-adjuster (the neck support 1) is combined with the Z-adjuster of the headrest 221. This allows the seat user in a reclined or relaxed position to extend another element to support the neck in addition to the headrest adjustment.

Figure 7:
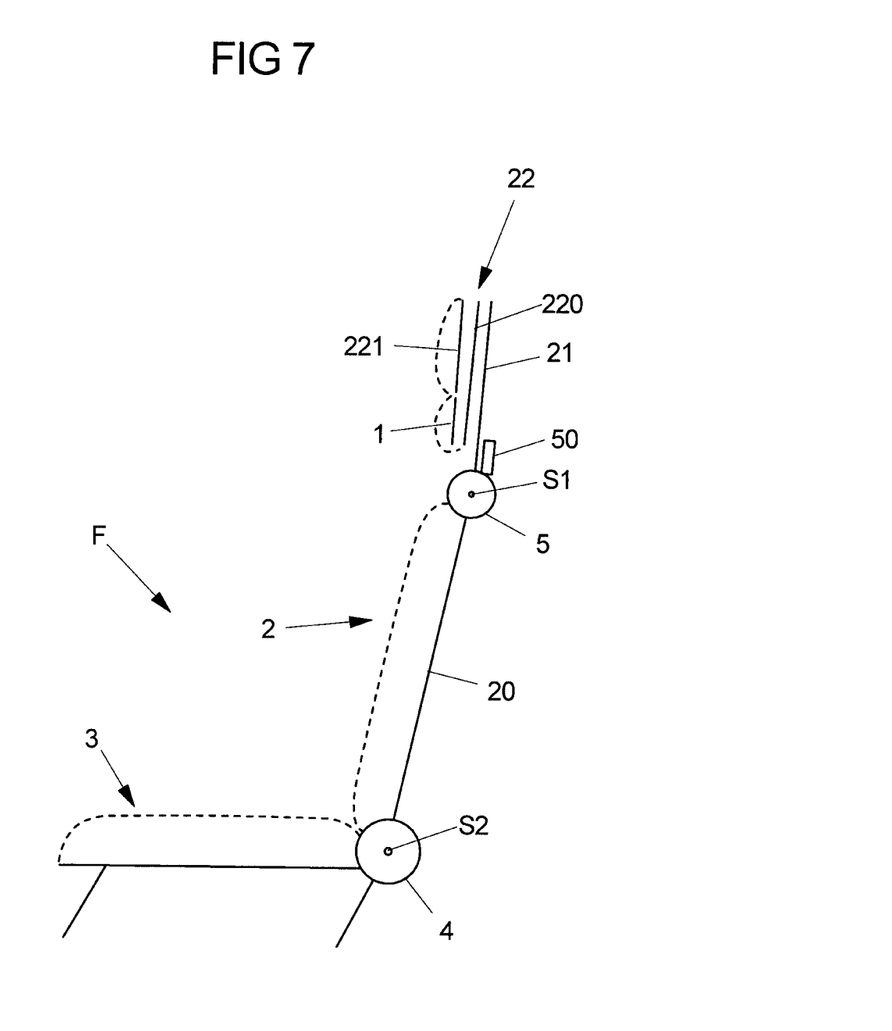
FIG. 7 shows a vehicle seat with a seat part and a backrest comprising the backrest head with the neck support of FIG. 1.

FIG. 7 shows a vehicle seat F with the backrest 2 according to FIG. 1. By means of a fitting arrangement 4, the backrest 2 is pivotable relative to the seat part 3 about a pivot axis S2. By means of a backrest head adjuster 5, the backrest head 21 is pivotally mounted on the backrest frame 20 about the pivot axis S1 also illustrated in FIG. 1. The backrest head adjuster 5 may include a motor 50 to effect this adjustment.

The supporting unit 22 is mounted on the backrest head 21 so as to be movable relative to the backrest head 21. The headrest 221 is held on the support unit 22 so as to be movable relative to the same. Furthermore, the neck support 1 is held on the support unit 22 so as to be movable relative to the same.

Dashed lines illustrate optional cushions.

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

LIST OF REFERENCE NUMERALS

1 neck support
10 base
100 bearing
101 guide portion
11 shield
12 pivoting element
120 end portion
13 slider
14 spindle
15 motor
16 shaft
17 transmission
2 backrest
20 backrest frame
21 backrest head (further backrest part)
210 rail
211 backrest head shield
22 support unit
220 carrier
221 headrest
222 holder
223 scissor mechanism
224 fastening point
225 motor
3 seat part
4 fitting arrangement
5 backrest head adjuster
50 motor
B seat user
F vehicle seat
S1, S2 pivot axis
V adjustment axis While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

The invention claimed is:

1. A neck support for use in a backrest, the neck support comprising:
   a base configured to be attached to the backrest;
   a shield configured to move relative to the base, wherein when the neck support is in use by a user, at least a section of the shield is configured to move in a direction towards the user in order to support the neck of a user;
   a first pivoting element connecting the base to the shield via a first slider, wherein the slider is mounted on and shiftable with respect to the base;
   a second pivoting element;
   a second slider, wherein the first and second pivoting elements are each pivotally held on one of the first and second sliders, and the shield is pivotally mounted on each of the first and second pivoting elements; and
   wherein the first and second pivoting elements are independently adjustable relative to the base.

2. The neck support of claim 1, wherein the first pivoting element is pivotally held on the first slider and pivotally connected to the shield.

3. The neck support of claim 1, further comprising: a spindle configured to rotate to shift the first slider relative to the base.

4. The neck support of claim 1, further comprising: a motor configured to shift the slider relative to the base.

5. The neck support of claim 1, further comprising:
   a first spindle and a second spindle; and
   a shaft operatively connecting the first spindle to the second spindle, wherein the first and second spindles are each configured to rotate to shift one of the first and second sliders relative to the base.

6. The neck support of claim 1, further comprising:
a first spindle and a second spindle; and
a first motor and a second motor, each configured to operate to rotate one of the first spindle and the second spindle relative to the base to shift one of the first and second sliders relative to the base.

7. The neck support of claim 5, wherein the shield is adjustable along an adjustment axis, and the first and second spindles are positioned coaxially aligned to one another and perpendicular to the adjustment axis.

8. The neck support of claim 1, wherein the shield is elastic.

9. A backrest for use in a vehicle seat, the backrest comprising:
a base configured to be attached to a frame of the backrest;
a shield configured to move relative to the base, wherein when the backrest is in use by a user, at least a section of the shield is configured to move in a direction towards the user in order to support a neck of a user; and
a first pivoting element connecting the base to the shield via a first slider, wherein the slider is mounted on and shiftable with respect to the base;
a second pivoting element;
a second slider, wherein the second pivoting element is pivotally coupled to the base and the shield; and
a first spindle operatively connected to the first slider; and
a second spindle operatively connected to the second slider, wherein the first and second sliders are configured to move along the base as the first and second spindles rotate.

10. The backrest of claim 9, wherein the first and second sliders are configured to move towards one another along the base as the shield moves in the direction towards the user.

11. The backrest of claim 9, wherein the first and second spindles are coaxially aligned with one another.

12. The backrest of claim 9, wherein the first slider is configured to move along the base independently from the second slider.

13. A support unit for a backrest, comprising a holder on which a headrest is mounted, wherein below the headrest, the neck support of claim 1 is mounted.

14. A neck support for use in a backrest, the neck support comprising:
a base configured to be attached to the backrest;
a shield configured to move relative to the base, wherein when the neck support is in use by a user, at least a section of the shield is configured to move in a direction towards the user in order to support the neck of a user;
a first pivoting element connecting the base to the shield via a first slider, wherein the slider is mounted on and shiftable with respect to the base;
a second pivoting element;
a second slider, wherein the first and second pivoting elements are each pivotally held on one of the first and second sliders, and the shield is pivotally mounted on each of the first and second pivoting elements;
wherein the first and second pivoting elements are independently adjustable relative to the base, and wherein ends of the first and second pivoting elements are closer to each other in a retracted position than in an extended position.

\* \* \* \* \*